Dec. 21, 1926.
L. LARSON
ACCOUNTING APPARATUS
Filed March 13, 1926   2 Sheets-Sheet 1
1,611,274
Inventor
LUDVIG LARSON,
By F. P. Gorin
Attorney Dec. 21, 1926. 1,611,274

L. LARSON

ACCOUNTING APPARATUS

Filed March 13, 1926   2 Sheets-Sheet 2

Inventor

LUDVIG LARSON,

By J. P. Gorin

Attorney

Patented Dec. 21, 1926.

1,611,274

UNITED STATES PATENT OFFICE.

LUDVIG LARSON, OF SEATTLE, WASHINGTON.

ACCOUNTING APPARATUS.

Application filed March 13, 1926. Serial No. 94,540.

This invention relates to an educational appliance, and particularly to a device designed for use in teaching bookkeeping and like systems.

In teaching bookkeeping systems, it is difficult for the student to visualize the transfer from credits to debits and the entries made necessary thereby by mere verbal instruction, and it is the object of the present invention to provide a means whereby the various details of such transfers may be rendered visible by physical emblems, which are directly transferred in accordance with the particular transaction.

The invention is illustrated in the accompanying drawings, in which:

Fig. 1 is a view in elevation of the device in the preferred form.

Fig. 2 is an edge view of the same.

Fig. 3 is a perspective view of one of the counters.

Fig. 4 is a view similar to Fig. 1 of a slightly modified form.

Fig. 5 is an edge view of the same.

The improved device comprises a section 1 of appropriate length and width formed with a central data receiving space 2, an upper data receiving space 3, and side columns 4 and 5 below the upper data receiving space and on each side of the central data receiving space. For the particular purposes of the bookkeeping instruction, the upper data receiving space 3 is divided centrally by a line 6 and ruled on one side as at 7 to indicate the sheet of a journal, and on the other side at 8 to indicate a sheet of a ledger. The spaces 2 and 3 are preferably of a character to permit writing thereon with convenient erasure when other data is to be inscribed, the surfaces of these spaces being for example, similar to that of a blackboard. The column 4 to the left of the central data space 2, will be termed the debit column and may be so indicated as at 9, the column 5 being the credit column and so indicated at 10. The respective columns 4 and 5 are provided with transverse parallel ledges 11 defining a series of transverse rows of counter-receiving spaces 12 which are in alignment across the section 1 and are interrupted by the data receiving space 2. A series of counters 13, preferably in the form of blocks, are designed to be supported upon the ledges 11, and these blocks bear on their faces suitable indicia, for example, numerals indicated at 14. The rows 12 are divided by vertical lines 15 into spaces corresponding in width to the width of the counters 13, and these spaces are arranged in groups and numbered consecutively as indicated at 16. The credit column, that is, the respective rows 12 thereof, are supposed to contain an appropriate number of the counters 13, and these counters will be given different surface numbers, for example, the first series will bear the number 10, the second series the number 100, the third series the number 1,000 and so on throughout the limit of any one particular row. With the rows on the credit side filled with the counters, the space 2 in line with the rows 12 of the debit and credit columns is for the purpose of the particular invention marked to indicate the different styles of accounts, for example, as "cash", "customers", "inventory", "sales", et cetera. Thus each account will have aligned with it, a credit row and a debit row. Assuming for example that the particular transaction is the payment of a hundred dollars ($100.00) in cash for purchases. A counter representing a hundred dollars ($100.00) is taken from the row 12 on the credit side in line with the cash account and transferred to a corresponding position in the row 12 on the debit side in line with purchases. This at once indicates to the student the physical fact that a hundred dollars ($100.00) in cash having been paid out for purchases, the one hundred dollars ($100.00) is taken from the credit side and applied to the debit side of purchases. Therefore, "cash" in the future entries in the journal and ledger is to be credited with one hundred dollars ($100.00) and "purchases" to be debited therewith.

The rows 12 on the debit side may be marked with the corresponding indications noted at 16 on the credit side, and with the space defining lines 15 shown in the credit column. In this use if ninety dollars ($90.00) for example, is to be taken from the credit side of "cash" and applied to the debit side of "purchases" the block or counter marked 10 in the space marked 9 will be taken from the "cash" side and applied to the similar space on the debit side of "purchases". Therefore, the relation of the counter on the debit side will be indicated by the position occupied, and the absence of such counter on the credit side will at once indicate the amount for which the particular counter stands, it being understood that the value of the counter indicated on its face multiplied by the number at the head of the space occupied by it represents the value of the counter.

As distinguished from this method of handling the counters, it is of course to be understood that the individual counters may be selectively colored or otherwise marked to indicate the value in addition to that value indicated on their face, the essential object here being to indicate in the space left absent on the removal of the counter on the credit side the presumed value of that counter, and to indicate by the position on the debit side the value of that counter as a debit transaction.

The section 1 may of course be of any appropriate size, that is, of a size adapting it for use on a desk, or of a size adapting it for use on a wall for the simultaneous instruction of a class. If it is preferred that at each physical transaction a corresponding entry be made in the journal and ledger, the space 3, which in the preferred form is integral with the section 1, may be formed on a separate strip 18, having lips 19 by which it may be slidably connected to the strip 1, as indicated in Fig. 5. Thus the section 3 on which the entries for the journal and ledger are to be made, may be adjusted longitudinally in accordance with such entries so that the proper entry of the particular transaction being made may be entered and the auxiliary strip 18 moved upwardly to permit a subsequent entry.

The important advantage of the particular device is that for each transaction indicated and to be taught the student, there is an actual physical and visual evidence of transfer from credit to debit and vice versa of the amount of the transaction. There is thus impressed upon the mind of the student the real underlying principle of the bookkeeping system, and he is ordinarily able to grasp the transaction more readily than under a mere verbal transfer of the particular item from the credit to the debit.

What I claim is:

1. In a device of the class described, the combination of a base support, a central section, a debit section upon one side of the central section and a credit section upon the other side of the same, each of the sections being divided horizontally to form shelves, each shelf being subdivided into receptacles, counters adapted to be applied to each section, the central section being adapted to receive the names of the accounts.

2. In a device of the class described, the combination of a base support, a central section, a debit section upon one side of the central section and a credit section upon the other side of the same, each of the sections being divided horizontally to form shelves, each shelf being subdivided into receptacles, counters of a predetermined value adapted to be applied to each section, the central section being adapted to receive the names of the accounts.

3. In a device of the class described, the combination of a base support, a central section, a debit section upon one side of the central section and a credit section upon the other side of the same, each of the sections being divided horizontally to form shelves, each shelf being subdivided into receptacles, counters each having its value shown upon its face adapted to be applied to each section, the central section being adapted to receive the names of the accounts.

4. In a device of the class described, the combination of a base support, a central section, a debit section upon one side of the central section and a credit section upon the other side of the same, each of the sections being divided horizontally to form shelves, each shelf being subdivided into receptacles, counters each having its value shown upon its face, adapted to be applied to each section, the central section being adapted to receive the names of the accounts, a supplemental board movable with respect to the base support and ruled in ledger and journal form whereby an abstract process and a physical process is demonstrated at the same time.

In testimony whereof I affix my signature.

LUDVIG LARSON.